United States Patent
Macaraeg et al.

(10) Patent No.: US 10,605,235 B2
(45) Date of Patent: Mar. 31, 2020

(54) SHAPE-MEMORY ALLOY POWER-ASSIST APPARATUS

(71) Applicant: The Boeing Company, Chicago, IL (US)

(72) Inventors: Sesinando P. Macaraeg, Everett, WA (US); Nelson J. Jeyarajah, Everett, WA (US); Frederick T. Calkins, Renton, WA (US)

(73) Assignee: The Boeing Company, Chicago, IL (US)

( * ) Notice: Subject to any disclaimer, the term of this patent is extended or adjusted under 35 U.S.C. 154(b) by 80 days.

(21) Appl. No.: 15/936,190

(22) Filed: Mar. 26, 2018

(65) Prior Publication Data

US 2019/0293057 A1    Sep. 26, 2019

(51) Int. Cl.
*F03G 7/06* (2006.01)
*B64D 11/00* (2006.01)

(52) U.S. Cl.
CPC ............ *F03G 7/065* (2013.01); *B64D 11/003* (2013.01)

(58) Field of Classification Search
CPC ............ F03G 7/065; G01K 5/483; G12B 1/00
USPC .................................................... 60/526–528
See application file for complete search history.

(56) References Cited

U.S. PATENT DOCUMENTS

| | | | | |
|---|---|---|---|---|
| 5,127,228 A | * | 7/1992 | Swenson | F03G 7/065 60/527 |
| 6,065,934 A | * | 5/2000 | Jacot | F03G 7/065 244/99.8 |
| 7,878,459 B2 | * | 2/2011 | Mabe | B64C 9/32 244/213 |
| 2012/0193183 A1 | * | 8/2012 | Gunter | B64C 9/16 192/48.1 |
| 2015/0354548 A1 | * | 12/2015 | Engeberg | F03G 7/065 60/527 |
| 2016/0075433 A1 | * | 3/2016 | Eakins | B64D 11/003 701/49 |
| 2016/0169213 A1 | * | 6/2016 | Calkins | F03G 7/065 60/527 |
| 2016/0348580 A1 | * | 12/2016 | Mabe | F03G 7/065 |
| 2016/0369784 A1 | * | 12/2016 | Brown | F03G 7/065 |

\* cited by examiner

*Primary Examiner* — Shafiq Mian
(74) *Attorney, Agent, or Firm* — Kunzler Bean & Adamson (57) ABSTRACT

A power-assist apparatus includes a shape-memory alloy (SMA) rod, a power source, an actuator, and a differential gearbox. The SMA rod configured to rotate at an end of the SMA rod. The power source is coupled to the SMA rod. The actuator coupled to an openable apparatus. The differential gearbox is coupled between the actuator and the SMA rod. The differential gearbox converts the rotation of the SMA rod to motion of the actuator.

20 Claims, 6 Drawing Sheets

SHAPE-MEMORY ALLOY POWER-ASSIST APPARATUS

FIELD

This disclosure relates generally to power-assist apparatuses, and more particularly to shape-memory alloy power-assist apparatuses for applications within an interior of an aircraft, such as stowage bins.

BACKGROUND

Many mechanisms on an aircraft may require relatively strong forces to open and close. For example, stowage bins, loaded with luggage, may weigh upwards of one hundred pounds or more, and require a sizeable force to open and close. As such, power-assist devices have been utilized to assist with the opening or closing of mechanisms, such as, stowage bins, doors, hatches, etc. Size, weight, noise and other considerations make some power-assist devices, such as noisy motors, a less than ideal solution when aggregating the number of power-assist devices within a system, which is the case for power-assist devices for stowage bins on an aircraft.

SUMMARY

The subject matter of the present application has been developed in response to the present state of the art, and in particular, in response to the problems and disadvantages associated with power-assist systems that have not yet been fully solved by currently available techniques. Accordingly, the subject matter of the present application has been developed to provide embodiments of a system, an apparatus, and a method that overcome at least some of the above-discussed shortcomings of prior art techniques. For example, according to one implementation, a power-assist apparatus is disclosed that facilitates the reduction or near elimination of the forces necessary to open and close aircraft stowage bins and other doors, hatches, etc.

Disclosed herein is a power-assist apparatus. The power-assist apparatus includes a shape-memory alloy (SMA) rod, a power source, an actuator, and a differential gearbox. The SMA rod configured to rotate at an end of the SMA rod. The power source is coupled to the SMA rod. The actuator is coupleable to an openable apparatus. The differential gearbox is coupled between the actuator and the SMA rod. The differential gearbox converts the rotation of the SMA rod to motion of the actuator. The preceding subject matter of this paragraph characterizes example 1 of the present disclosure.

The power-assist apparatus includes a sensor coupled to the power-assist apparatus and configured to detect an external opening or closing force on the openable apparatus. The preceding subject matter of this paragraph characterizes example 2 of the present disclosure, wherein example 2 also includes the subject matter according to example 1, above.

The actuator is configured to reduce a minimum force necessary to open or close the openable apparatus. The preceding subject matter of this paragraph characterizes example 3 of the present disclosure, wherein example 3 also includes the subject matter according to any of examples 1 and 2, above.

The actuator is a ball bearing screw drive. The preceding subject matter of this paragraph characterizes example 4 of the present disclosure, wherein example 4 also includes the subject matter according to any one of examples 1-3, above.

The power-assist apparatus includes a plurality of SMA rods each coupled to a corresponding one of a plurality of differential gearboxes, wherein each of the plurality of differential gearboxes is coupled to a corresponding one of a plurality of actuators. The preceding subject matter of this paragraph characterizes example 5 of the present disclosure, wherein example 5 also includes the subject matter according to any one of examples 1-4, above.

The openable apparatus includes an aircraft stowage bin comprising a door hingedly coupled to a cabinet. The preceding subject matter of this paragraph characterizes example 6 of the present disclosure, wherein example 6 also includes the subject matter according to any one of examples 1-5, above.

The actuator is coupled at one end to the door of the stowage bin and at an opposite end to the cabinet of the stowage bin. The preceding subject matter of this paragraph characterizes example 7 of the present disclosure, wherein example 7 also includes the subject matter according to example 6, above.

The power-assist apparatus includes a rate control sensor configured to control a rate of closing or opening of the openable apparatus. The preceding subject matter of this paragraph characterizes example 8 of the present disclosure, wherein example 8 also includes the subject matter according to any one of examples 1-7, above.

The SMA rod is perpendicular to the actuator. The preceding subject matter of this paragraph characterizes example 9 of the present disclosure, wherein example 9 also includes the subject matter according to any one of examples 1-8, above.

The SMA rod is coupled to the differential gearbox at one end of the SMA rod and coupled to another differential gearbox at an opposite end of the SMA rod. The preceding subject matter of this paragraph characterizes example 10 of the present disclosure, wherein example 10 also includes the subject matter according to any one of examples 1-9, above.

The actuator is a linear actuator. The preceding subject matter of this paragraph characterizes example 11 of the present disclosure, wherein example 11 also includes the subject matter according to any one of examples 1-10, above.

Also disclosed herein is a system. The system includes an openable apparatus and a power-assist apparatus. The power-assist apparatus includes a shape-memory alloy (SMA) rod, a power source, an actuator, and a differential gearbox. The SMA rod configured to rotate at an end of the SMA rod. The power source is coupled to the SMA rod. The actuator coupled to an openable apparatus. The differential gearbox is coupled between the actuator and the SMA rod. The differential gearbox converts the rotation of the SMA rod to motion of the actuator and actuation of the openable apparatus. The preceding subject matter of this paragraph characterizes example 12 of the present disclosure.

The power-assist apparatus further includes a plurality of SMA rods each coupled to a corresponding one of a plurality of differential gearboxes, wherein each of the plurality of differential gearboxes is coupled to a corresponding one of a plurality of actuators. The preceding subject matter of this paragraph characterizes example 13 of the present disclosure, wherein example 13 also includes the subject matter according to example 12, above.

The openable apparatus includes an aircraft stowage bin. The preceding subject matter of this paragraph characterizes example 14 of the present disclosure, wherein example 14 also includes the subject matter according to any one of examples 12 and 13, above.

The power-assist apparatus further comprises a torque limiter between the power source and the SMA rod, the torque limiter being configured to regulate electrical current supplied to the SMA rod from the power source. The preceding subject matter of this paragraph characterizes example 15 of the present disclosure, wherein example 15 also includes the subject matter according to any one of examples 12-14, above.

The system further includes a sensor coupled to the power-assist apparatus and configured to detect an external opening or closing force on the openable apparatus. The preceding subject matter of this paragraph characterizes example 16 of the present disclosure, wherein example 16 also includes the subject matter according to any one of examples 12-15, above.

Also disclosed herein is a method. The method includes heating a shape-memory alloy (SMA) rod to cause the SMA rod to rotate, the SMA rod coupled to an interior part of an aircraft. The method also includes converting torque of the SMA rod to motion of an actuator, wherein the motion of the actuator reduces a closing or opening force on an openable apparatus. The preceding subject matter of this paragraph characterizes example 17 of the present disclosure.

The method further includes sensing an external opening or closing force on the openable apparatus and adjusting a temperature of the SMA rod in response to sensing the external opening or closing force. The preceding subject matter of this paragraph characterizes example 18 of the present disclosure, wherein example 18 also includes the subject matter according to example 17, above.

The method further includes applying an assisting force to the openable apparatus, wherein the openable apparatus is a stowage bin. The preceding subject matter of this paragraph characterizes example 19 of the present disclosure, wherein example 19 also includes the subject matter according to any one of examples 17-18, above.

The method further includes converting the torque of the SMA rod to motion of the actuator. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
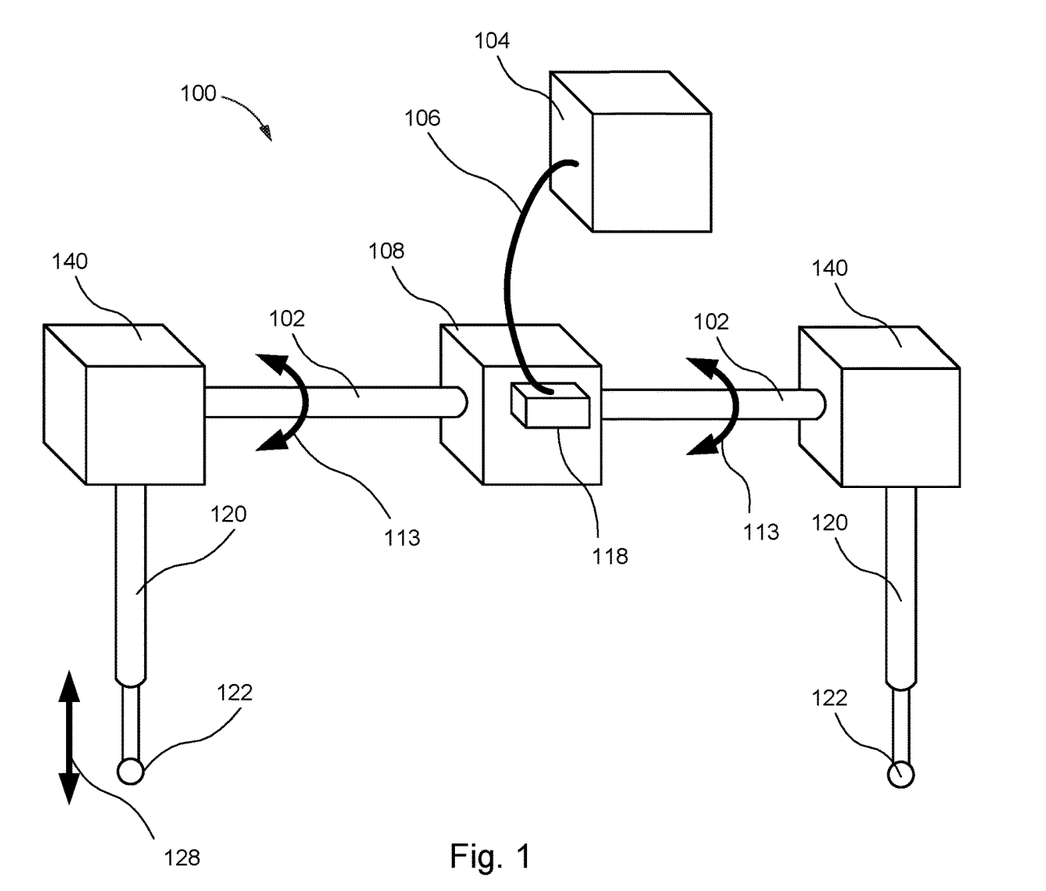
FIG. 1 is a perspective view of a power-assist apparatus, according to one or more embodiments of the present disclosure.

Referring to FIG. 1, one embodiment of a power-assist apparatus 100 is shown. The power-assist apparatus 100 is used to mechanically assist or enable the opening or closing of an openable apparatus 130 (see, e.g., FIGS. 2 and 3). In the illustrated embodiment of FIGS. 2 and 3, the openable apparatus 130 is a stowage bin on a vehicle, such as an aircraft. However, in general, the openable apparatus 130 can be any apparatus that includes at least two parts where one of the parts can be opened, or closed, relative to another of the parts. As described in more detail below, the power-assist apparatus 100 includes a shape-memory alloy (SMA) rod 102 and a differential gearbox 140.

The SMA rod 102 is made of a shape-memory alloy. Generally, a shape-memory alloy is in a martensite low temperature phase with a cubic or monoclinic crystal structure, which begins to transform into an austenite high temperature phase with a cubic crystal upon reaching a first austenite threshold temperature. The transformation from the martensite low temperature phase to the austenite high temperature phase is completed upon reaching a second austenite threshold temperature higher than the first austenite threshold temperature. From the austenite high temperature phase, the transformation to the martensite low temperature phase is initiated and completed after the temperature of the shape-memory alloy is cooled below first and second martensite threshold temperatures, respectively. As the shape-memory alloy transforms between the austenite high temperature phase and martensite low temperature phase, the alloy physically deforms between an original shape and a deformed shape.

The shape-memory alloy can be configured to deform between an original shape and a deformed shape based on the temperature of the shape-memory alloy. More specifically, shape-memory alloys are special metallic materials that are capable of returning to a previously defined shape (e.g., original shape) after being heated to deformation (e.g., a deformed state). Generally, a shape-memory alloy can be trained to deform in a particular manner from the original shape into the deformed state when a temperature of the shape-memory alloy increases beyond an upper temperature threshold and deform in the same manner back to the original shape from the deformed state when the temperature of the shape-memory alloy decreases below a lower temperature threshold. In some embodiments, the shape-memory alloy of the SMA rod 102 is at least one of various nickel-titanium alloys and copper-based alloys, among others. The composition of the shape-memory alloy can be selected to provide a desired range of deformation as well as desired upper and lower threshold temperatures associated with respective phase changes of the alloy.

The SMA rod 102 may be a solid rod, or a hollow tube, that deforms through rotation or twisting of the SMA rod 102, about a central axis of the SMA rod 102, at one or both longitudinal ends of the SMA rod 102. Torque or rotational motion generated at one or both longitudinal ends of the SMA rod 102 is converted to linear motion or transmitted as rotational motion to at least partially power the opening or closing of an openable apparatus 130. In some embodiments, the power-assist apparatus 100 provides an entirety of the power or force to open and close the openable apparatus 130. In some embodiments, the power-assist apparatus 100 provides only a portion of the power or force to open or close the openable apparatus 130 with the remaining portion of the power or force provided manually by a human operator or user. In this manner, the power-assist apparatus 100, in effect, assists a human operator in the opening and closing of the openable apparatus 130 by reducing the human-provided force necessary to open or close the openable apparatus 130.

The SMA rod 102 is coupled to a power source 104 which powers a thermal regulation device 108 of the power-assist apparatus 100. The thermal regulation device 108 is configured to transfer heat (e.g., in the form of electrical current) to and from the SMA rod 102 and thus induce deformation between an original shape and a deformed shape. The thermal regulation device 108 is a device that transfers heat through conduction, convection, or radiation. In some embodiments, the thermal regulation device 108 merely provides current to the SMA rod 102. In one implementation, the introduction of current heats the SMA rod 102 to induce deformation away from an original shape and the reducing or removal of the current induces deformation of the SMA rod 102 back to the original shape of the SMA rod 102.

Other forms of heat generation are contemplated. In one embodiment, the thermal regulation device 108 utilizes a heat generation element and heat pipes, heat sinks, etc. In an embodiment, the thermal regulation device 108 is a P—N element. The thermal regulation device may include thermally conductive elements with any of various geometries or number of contact points with the SMA rod 102 to facilitate thermal transfer into or out of the SMA rod 102. In one implementation, the thermally conductive elements of the thermal regulation device 108 may have thermal management geometries or features, such as fins, to facilitate heat transfer.

The SMA rod 102 allows for a power-assist apparatus 100 that is compact and lightweight. In some embodiments, the SMA rod 102 is less than one inch in diameter, allowing the power-assist apparatus 100 to fit in tight spaces within an aircraft. As only current, in some embodiments, is applied to heat the SMA rod 102, the diameter of the SMA rod 102 is the majority or all the space needed.

The thermal transfer device 108 is shown as a box positioned at the midpoint of the SMA rod 102. The thermal transfer device 108 may be located anywhere along the SMA rod 102 and may be localized at a certain point on the SMA rod 102 or at multiple points along the SMA rod 102. In some embodiments, the thermal transfer device 108 is positioned along a majority of the length of the SMA rod with only a single end or both ends exposed.

The thermal regulation device 108 is coupled to a power source 104 that supplies power to the thermal regulation device 108. The power source 104 can be an electrical power supply. In one embodiment, the power source 104 is power supplied by the aircraft. In an embodiment, the power source 104 is an energy-harvesting device or other localized power supply unique to the openable apparatus 130 to which the power-assist apparatus 100 is coupled.

The power source 104 is coupled to the thermal regulation device 108 by a data cord 106, which can, alternatively or additionally, be a power cord. The data cord 106 allows for electrical communication to the thermal regulation device 108 from a control system to regulate the amount of heat transfer provided by the thermal regulation device 108. A torque limiter 118 may protect the power-assist apparatus 100 from damage by mechanical overload by use of a clutch or other mechanical instruments. In many embodiments, the torque limiter 118 merely regulates the amount of current applied to the SMA rod 102.

The SMA rod 102 is configured to rotate as shown by arrows 113. The SMA rod 102 may be configured twist or rotate at the ends of the SMA rod 102. In some embodiments, each end of the SMA rod 102 is configured to rotate in a same direction. In some embodiments, each end of the SMA rod 102 is configured to rotate in a direction opposite that of the other end.

The torque created at the ends of the SMA rod 102 may be harnessed by differential gearboxes 140 which are coupled at the ends of the SMA rod 102. In the illustrated embodiment, the SMA rod 102 is a single SMA rod. In some embodiments, there are two separate SMA rods 102 each extending out opposite sides of the thermal regulation device 108. The differential gearboxes 140 are transfer cases configured to convert the rotation of the SMA rod 102 into a mechanical movement. In the illustrated embodiment, the differential gearboxes 140 are coupled to actuators 120. The differential gearboxes 140 are shown schematically as the specific mechanics of the differential gearboxes 140 may be implemented in a variety of known techniques.

The actuators 120 are linear actuators in certain embodiments. In other embodiments, however, the actuators 120 may be rotary actuators. The differential gearboxes 140 are driven by the rotation of the SMA rod 102. By rotating the SMA rod 102, the differential gearboxes 140 are driven to actuate the actuators 120. As the SMA rod 102 may be controlled through a thermal regulation device, the actuators 120 are powered without noisy and costly motors which also take up space and add significant weight. While a single motor may not create a large amount of noise or take up a large amount of space on an aircraft, the power-assist apparatus 100 may be deployed at each stowage bin or other openable apparatus 130 and the noise reduction and space savings are compounded.

In some embodiments, the actuator 120 is a ball bearing screw drive. The actuators 120 may be any of a variety of mechanical actuators including, but not limited to screw drive actuators, wheel and axle actuators (chain drive, belt drive, etc.), cam actuators, etc.

The actuators 120 include an attachment link 122. The attachment link 122 may be coupled to any of a variety of mechanisms that require actuation. On an aircraft this may include overhead stowage bins, compartments, monument doors or other types of doors.

Figure 2:
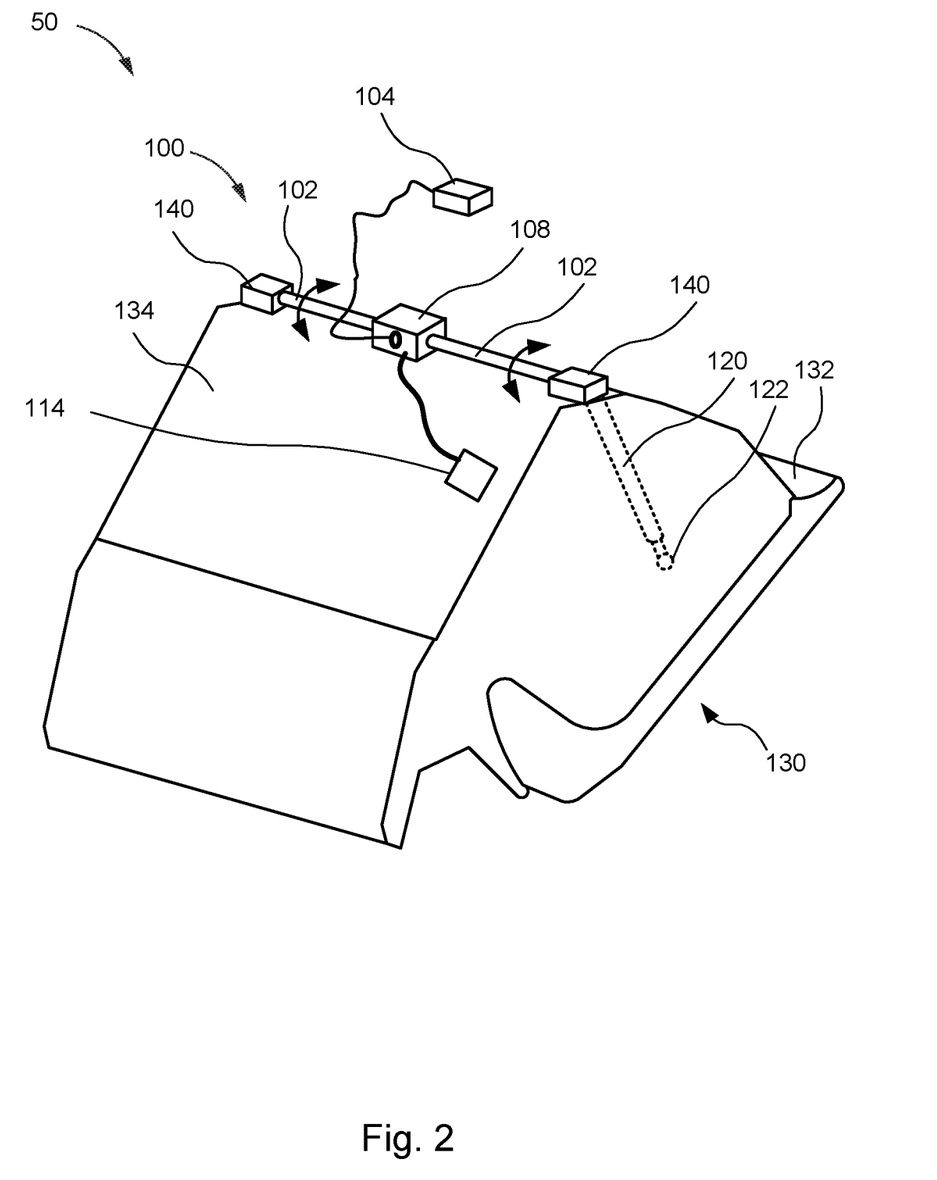
FIG. 2 is a perspective view of a system, according to one or more embodiments of the present disclosure.

Referring now to FIG. 2, according to another embodiment, a power-assist apparatus 100 is shown coupled to an openable apparatus 130, which in FIG. 2 is a stowage bin. FIG. 2 is a rear perspective view of the openable apparatus 130, thus depicting the backside of the stowage bin, which would not be visible to a user in an aircraft. In the illustrated embodiment, the stowage bin of the openable apparatus 130 is an overhead stowage bin of an aircraft. However, in other embodiments, the openable apparatus 130 may include other types of storage or any door or hinged hatch on an aircraft or other vehicle. In the illustrated embodiment, the openable apparatus 130 includes a door 132 and a cabinet 134. The door 132 is hingedly coupled to the cabinet 134 to promote rotatable motion of the door 132 relative to the cabinet 134 between a closed position (e.g., FIG. 2) and an open position (e.g., FIG. 3). The openable apparatus 130 is coupled to the interior of an aircraft (not shown).

The power-assist apparatus 100 is coupled to the openable apparatus 130 in any of various ways. Specifically, in one example, the SMA rod 102 is coupled to the cabinet 134 at an anchor point in the center of the SMA rod. The SMA rod 102 is coupled at the anchor point within thermal regulation device 108 by mechanical means. The SMA rod 102 may be anchored anywhere along SMA rod 102 including at one of the ends of the SMA rod 102. The SMA rod 102 may be coupled to another part of the interior of an aircraft.

In the illustrated embodiment, the SMA rod 102 extends out from the thermal regulation device 108 in opposite directions to the side of the openable apparatus 130. The SMA rod 102 may freely rotate relative the anchor point in twisting matter to create torsion at both ends of the SMA rod 102. In embodiments where the SMA rod 102 is anchored at one end of the SMA rod 102, the SMA rod 102 will twist or rotate at the opposite end.

At each end of the SMA rod 102, the SMA rod 102 is coupled to a differential gearbox 140. The differential gearbox 140 is further coupled an actuator 120. The actuator 120 extends through a hole in the cabinet 134 and is positioned between the door 132 and the cabinet 134. The actuator 120 is shown as dotted lines to depict the positioning of the actuator 120 within the cabinet 134. The actuator 120 is coupled to the door 132 at an attachment link 122.

Figure 3:
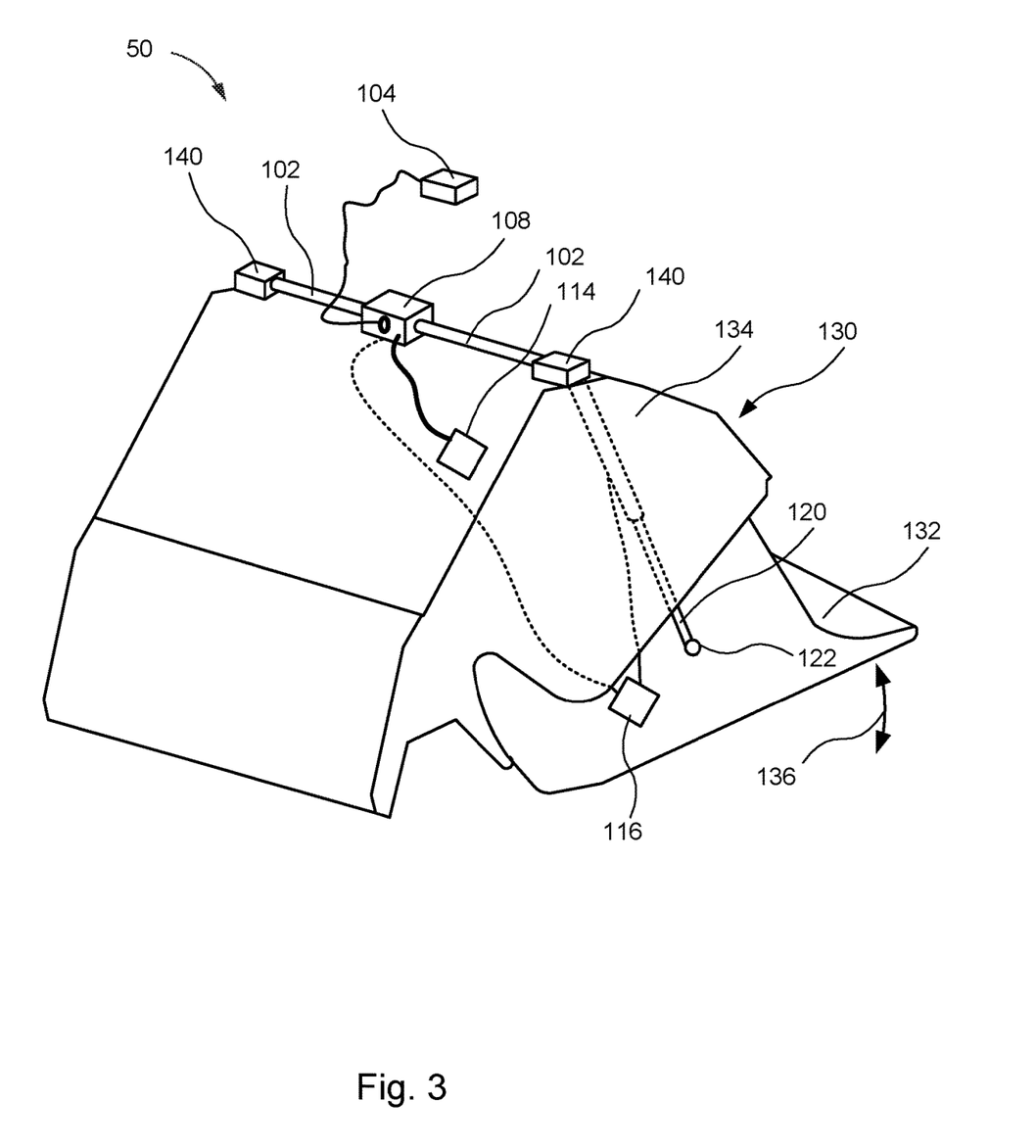
FIG. 3 is a perspective view of a system, according to one or more embodiments of the present disclosure.

In the illustrated embodiment, the actuator 120 is a linear actuator. The torque of the SMA rod 102 is converted to linear motion of the actuator 120. As the actuator 120 actuates, the attachment link 122 pushes open or pulls closed the door 132. Referring to FIG. 3, the actuator 120 has been actuated to open the door 132. Arrows 136 depict the motion of the door 132.

Referring to FIG. 3, various sensors 114 may be placed on or near the power-assist apparatus 100 or the openable apparatus 130. The sensors 114 are configured to determine any external forces acting on the openable apparatus 130.

For example, a person opening or closing the openable apparatus 130 can be sensed by sensor 114. Upon sensing an external opening or closing force, the power-assist apparatus 100 is activated to reduce the necessary opening or closing force to move the door 132. In some embodiments, the sensors 114 may also sense the weight of the contents of the stowage bin. As an example, the stowage bin may be completely empty or completely full.

The sensors 114 may provide feedback to the power-assist mechanism to provide adequate compensating force to allow the openable apparatus 130 to be opened or closed with the same external force regardless of the weight of the contents within the stowage bin. Sensor 114 is coupled to the thermal regulation device 108. By controlling the rate and amount of heat transfer, the SMA rod 102 can be controlled in a precise manner to provide the appropriate amount of compensating force.

In some embodiments, the sensors 114 are configured to determine the location of the external force. An external force located closer to a hinge does not provide as great a closing force (or opening force) as a same magnitude force located farther from the hinge. In some embodiments, the sensors 114 are configured to determine the angle of the external force. Depending on the location of the external force and the angle of the external force, more or less compensating force may be provided by the power-assist apparatus 100. In some embodiments, the sensors 114 may be configured to detect the engagement of a handle or latch to indicate the opening of the openable apparatus 130.

Some embodiments may further include a rate control sensor 116. The rate control sensor 116 is configured to control the rate of closure of the openable apparatus 130 so that the openable apparatus 130 opens and closes at a consistent rate regardless of the amount of external force being applied. The rate control sensor 116 is connected to the actuator 120, which restricts the rate of opening and closing. The actuator 120 may include a pneumatic piston, or a hydraulic or electro-mechanical piston as part of its design. The rate control sensor 116 is further connected to the thermal regulation device 108 and/or the torque limiter 118. While the embodiment described herein involves an external force, the power-assist mechanism 100 may fully empower the opening or closing of the openable apparatus 130.

Figure 4:
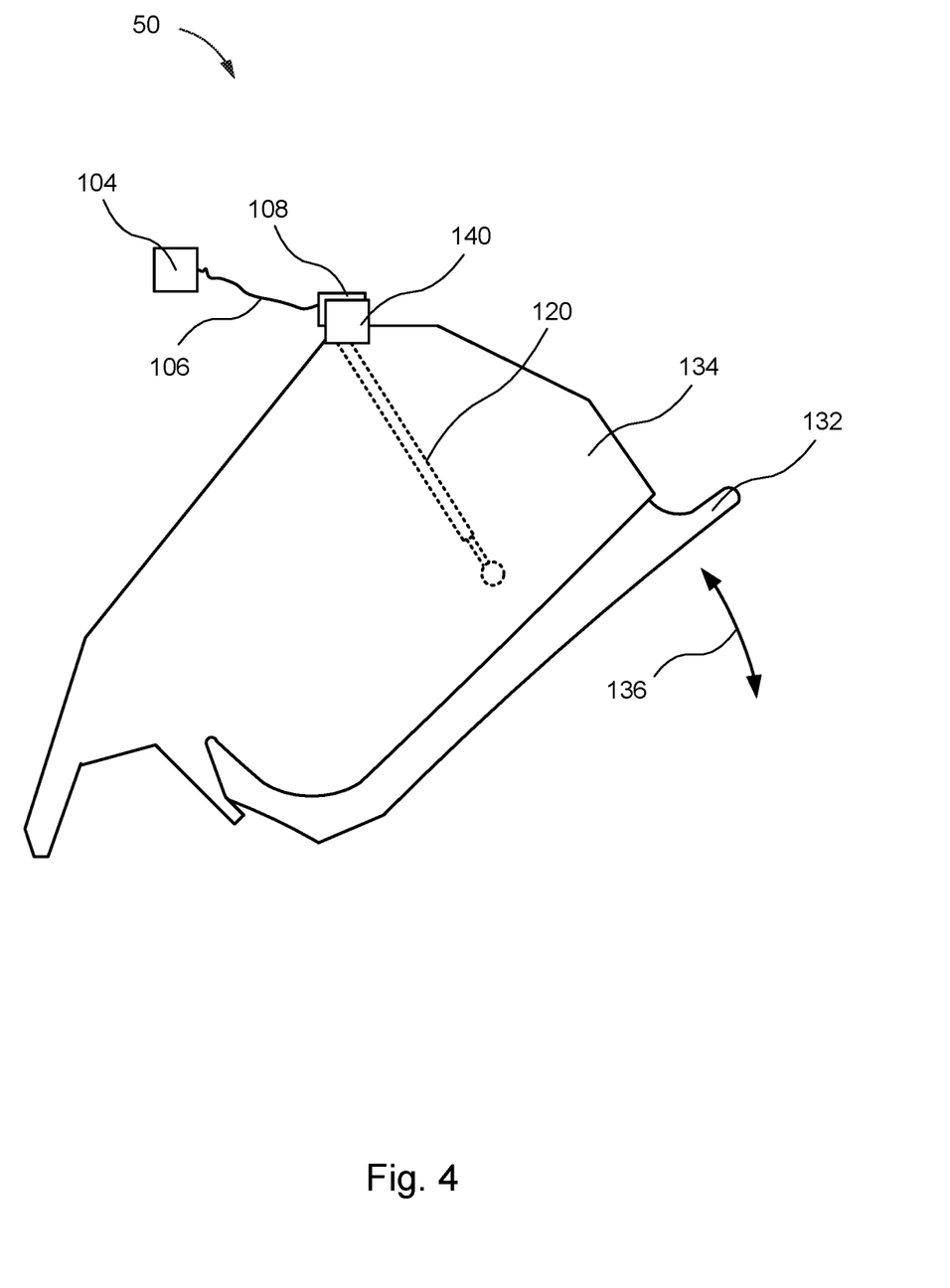
FIG. 4 is a side view of a system, according to one or more embodiments of the present disclosure.

Referring to FIG. 4, a side view of the openable apparatus 130 and power-assist apparatus 100 are shown. In the illustrated embodiment, the actuator 120 is a linear actuator and is perpendicular to the SMA rod 102. The SMA rod 102 is positioned on top of the openable apparatus 130 and extends along a width of the openable apparatus 130 to each side, in which one side is shown in FIG. 4. The opposite side of the openable apparatus 130 is similar in design and function to the side shown in FIG. 4. The SMA rod 102 is configured to provide torque to both sides of the openable apparatus 130 and actuate actuators 120 on each side.

In some embodiments, the ends of the SMA rod 102 rotate in opposite directions. In such embodiments, the differential gearboxes 140 will be inverse to each other such that both differential gearboxes 140 actuate their respective actuators 120 in the same direction.

Figure 5:
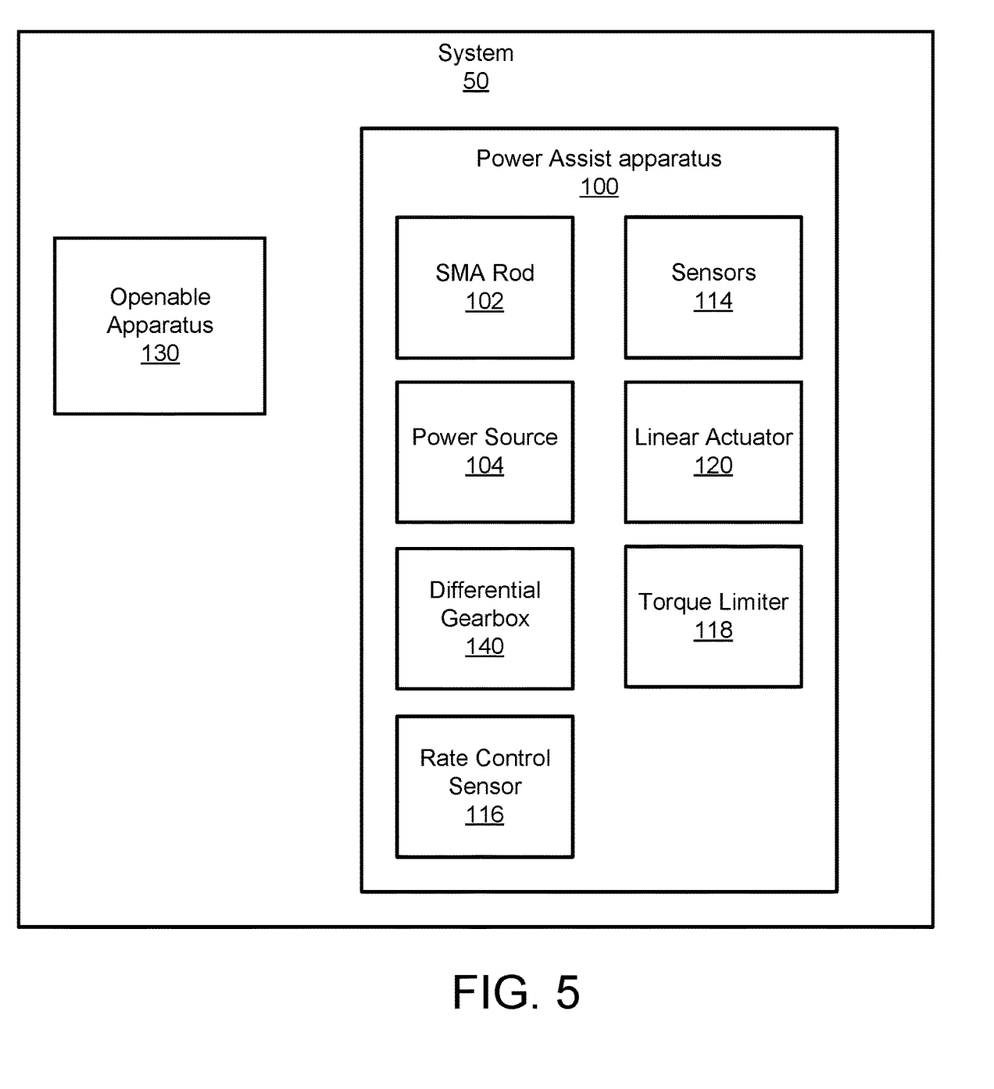
FIG. 5 is a block diagram of a system, according to one or more embodiments of the present disclosure.

Referring now to FIG. 5, a block diagram of a system 50 is shown. The system 50 includes a power-assist apparatus 100, an openable apparatus 130, and a rate control sensor 116. The power-assist apparatus 100 is configured to assist or empower the opening and closing the openable apparatus 130. The power-assist apparatus 100 includes an SMA rod 102, a thermal regulation device 108, a differential gearbox 140, sensors 114, actuator 120, and torque limiter 118. The power-assist apparatus 100 may include some or all of the features described herein in conjunction with the remaining figures. The sensors 114, rate control sensor 116, and the torque limiter 118 may be part of a control system. The torque limiter 118 may protect the power-assist apparatus 100 from damage by mechanical overload by use of a clutch or other mechanical instruments. In many embodiments, the torque limiter 118 merely regulates the amount of current applied to the SMA rod 102.

The control system may include various components, not illustrated, to allow for control of the components of the power-assist apparatus 100 described herein, such as, but not limited to, processors, memory, computer hardware and software, and modules. The control system may be further configured to measure or receive sensor readings and adjust the power-assist apparatus 100 accordingly.

Figure 6:
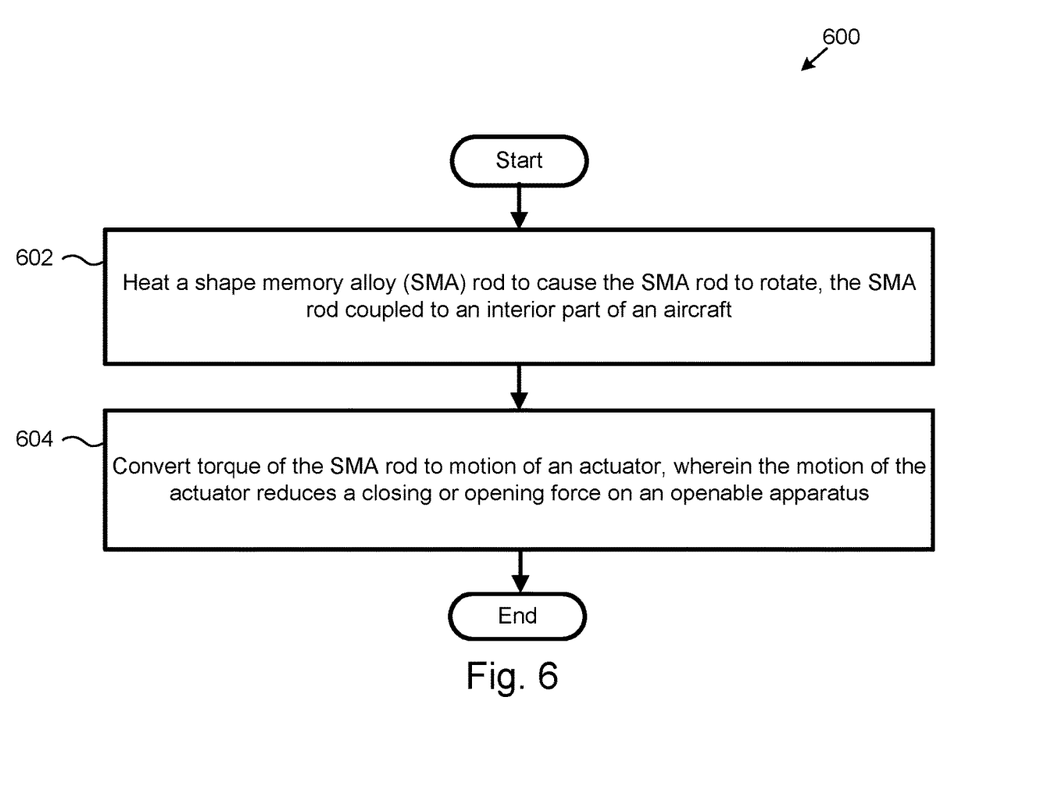
FIG. 6 is a schematic flow diagram of a method, according to one or more embodiments of the present disclosure.

Now referring to FIG. 6, one embodiment of a method 600 is shown. The method 600 includes transferring 602 heat to or heating a shape-memory alloy (SMA) rod to cause the SMA rod to rotate, the SMA rod coupled to an interior part of an aircraft. The method 600 further includes converting 604 torque of the SMA rod to a linear motion of a linear actuator, wherein the linear motion of the linear actuator reduces a closing or opening force on an openable apparatus. The method then ends.

In some embodiments, the method may further include sensing an external opening or closing force on the openable apparatus and adjusting the heat transferred to the SMA rod.

In some embodiments, the method 600 may include applying an assisting force to the openable apparatus. In some embodiments, the openable apparatus is a stowage bin. In some embodiments, the method may include converting the torque of the SMA rod to linear motion, wherein the actuator is a linear actuator. In some embodiments, the transferring heat comprises applying a current to the SMA rod. In some embodiments, the method includes converting the torque of the SMA rod (102) to drive a screw drive.

Although described in a depicted order, the method 600 may proceed in any of a number of ordered combinations.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive.

All changes which come within the meaning and range of equivalency of the claims are to be embraced within their scope.

What is claimed is:

1. A power-assist apparatus comprising:
   a shape-memory alloy (SMA) rod configured to rotate at an end of the SMA rod;
   a power source coupled to the SMA rod;
   an actuator coupleable to an openable apparatus; and
   a differential gearbox coupled between the actuator and the SMA rod, wherein the differential gearbox converts the rotation of the SMA rod to motion of the actuator;
   wherein the openable apparatus comprises an aircraft stowage bin comprising a door hingedly coupled to a cabinet.

2. The power-assist apparatus according to claim 1, further comprising a sensor coupled to the power-assist apparatus and configured to detect an external opening or closing force on the openable apparatus.

3. The power-assist apparatus according to claim 1, wherein the actuator is configured to reduce a minimum force necessary to open or close the openable apparatus.

4. The power-assist apparatus according to claim 1, wherein the actuator is a ball bearing screw drive.

5. The power-assist apparatus according to claim 1, further comprising a plurality of SMA rods each coupled to a corresponding one of a plurality of differential gearboxes, wherein each of the plurality of differential gearboxes is coupled to a corresponding one of a plurality of actuators.

6. The power-assist apparatus according to claim 1, wherein the actuator is coupleable at one end to the door and at an opposite end to the cabinet.

7. The power-assist apparatus according to claim 1, further comprising a rate control sensor configured to control a rate of closing or opening of the openable apparatus.

8. The power-assist apparatus according to claim 1, wherein the SMA rod is perpendicular to the actuator.

9. The power-assist apparatus according to claim 1, wherein the SMA rod is coupled to the differential gearbox at one end of the SMA rod and coupled to another differential gearbox at an opposite end of the SMA rod.

10. The power-assist apparatus according to claim 1, wherein the actuator is a linear actuator.

11. A system comprising:
    an openable apparatus; and
    a power-assist apparatus comprising:
      a shape-memory alloy (SMA) rod configured to rotate at an end of the SMA rod;
      a power source coupled to the SMA rod;
      an actuator coupled to the openable apparatus; and
      a differential gearbox coupled between the actuator and the SMA rod, wherein the differential gearbox converts the rotation of the SMA rod to motion of the actuator and actuation of the openable apparatus;
    wherein one of:
      the power-assist apparatus further comprises a plurality of SMA rods each coupled to a corresponding one of a plurality of differential gearboxes, wherein each of the plurality of differential gearboxes is coupled to a corresponding one of a plurality of actuators; or
      the SMA rod is coupled to the differential gearbox at one end of the SMA rod and coupled to another differential gearbox at an opposite end of the SMA rod.

12. The system according to claim 11, wherein the power-assist apparatus further comprises the plurality of SMA rods each coupled to a corresponding one of a plurality of differential gearboxes.

13. The system according to claim 12, wherein the openable apparatus comprises an aircraft stowage bin.

14. The system according to claim 11, wherein the power-assist apparatus further comprises a torque limiter between the power source and the SMA rod, the torque limiter being configured to regulate electrical current supplied to the SMA rod from the power source.

15. The system according to claim 11, further comprising a sensor coupled to the power-assist apparatus and configured to detect an external opening or closing force on the openable apparatus.

16. A method comprising:
    heating to a shape-memory alloy (SMA) rod to cause the SMA rod to rotate, the SMA rod coupled to an interior part of an aircraft;
    converting torque of the SMA rod to motion of an actuator, wherein the motion of the actuator applies a closing or opening force on an openable apparatus; and
    sensing an external opening or closing force on the openable apparatus and adjusting a temperature of the SMA rod in response to sensing the external opening or closing force.

17. The method according to claim 16, further comprising applying an assisting force to the openable apparatus, wherein the openable apparatus is a stowage bin.

18. The power-assist apparatus according to claim 2, wherein the power source supplies power to the SMA rod to adjust a temperature of the SMA rod in response to detection, by the sensor, of an external opening or closing force on the openable apparatus.

19. The system according to claim 15, wherein the power source supplies power to the SMA rod to adjust a temperature of the SMA rod in response to detection, by the sensor, of an external opening or closing force on the openable apparatus.

20. The method according to claim 16, wherein the motion of the actuator is a linear motion.

* * * * *